(12) United States Patent
Martinez et al.

(10) Patent No.: US 8,282,287 B2
(45) Date of Patent: Oct. 9, 2012

(54) CONNECTING ARRANGEMENT FOR CONNECTING A MOWING KNIFE TO A MOWING KNIFE DRIVE JOURNAL

(75) Inventors: Mönica Gil Martinez, Madrid (ES); Ryan S. Herlyn, Port Byron, IL (US)

(73) Assignee: Deere & Company, Moline, IL (US)

( * ) Notice: Subject to any disclaimer, the term of this patent is extended or adjusted under 35 U.S.C. 154(b) by 315 days.

(21) Appl. No.: 12/701,193

(22) Filed: Feb. 5, 2010

(65) Prior Publication Data
US 2010/0209033 A1 Aug. 19, 2010

(30) Foreign Application Priority Data

Feb. 13, 2009 (DE) .......................... 10 2009 008 961
Feb. 17, 2009 (DE) .......................... 10 2009 000 939

(51) Int. Cl.
*F16C 23/04* (2006.01)

(52) U.S. Cl. ............................ 384/495; 384/583; 475/11

(58) Field of Classification Search .................. 384/583, 384/201, 488, 500, 510, 281, 441, 537, 495–498; 475/11, 5, 317; 56/296, 287, 289
See application file for complete search history.

(56) References Cited

U.S. PATENT DOCUMENTS

| | | | |
|---|---|---|---|
| 4,331,367 A * | 5/1982 | Trudeau et al. ............... | 384/202 |
| 4,813,291 A * | 3/1989 | Schumacher et al. ............ | 74/52 |
| 5,061,087 A * | 10/1991 | Roerig et al. ................. | 384/192 |
| 6,216,429 B1 * | 4/2001 | McCredie ....................... | 56/287 |
| 6,273,214 B1 * | 8/2001 | Schumacher ................ | 184/6.12 |
| 6,648,514 B2 * | 11/2003 | Cevasco et al. ............... | 384/281 |
| 6,876,111 B2 * | 4/2005 | Kuroda et al. .................. | 310/90 |
| 7,708,664 B2 * | 5/2010 | Schumacher et al. .......... | 475/11 |
| 7,743,592 B2 * | 6/2010 | Schumacher et al. .......... | 56/17.6 |
| 2007/0087891 A1 * | 4/2007 | Schumacher et al. ........ | 475/317 |
| 2007/0209345 A1 * | 9/2007 | Schumacher et al. ......... | 56/12.6 |
| 2010/0255945 A1 * | 10/2010 | Schumacher et al. .......... | 475/11 |

FOREIGN PATENT DOCUMENTS

| | | |
|---|---|---|
| DE | 846178 C | 8/1952 |
| DE | 3701397 A1 | 7/1988 |
| DE | 4018021 C1 | 1/1992 |
| DE | 102006010825 A1 | 9/2007 |

OTHER PUBLICATIONS

European Search Report dated Jul. 5, 2010, (4 pages).

\* cited by examiner

*Primary Examiner* — Arpad Fabian-Kovacs

(57) ABSTRACT

A connecting arrangement (10) for connecting a mowing knife to a mowing knife drive journal (12) has an annularly configured connecting element (16), a bearing arrangement (18) receivable in the connecting element (16), for mounting of the connecting element (16) on a mowing knife drive journal (12), and a mowing knife carrier (14) attachable to the connecting element (16).

10 Claims, 5 Drawing Sheets

CONNECTING ARRANGEMENT FOR CONNECTING A MOWING KNIFE TO A MOWING KNIFE DRIVE JOURNAL

FIELD OF THE INVENTION

The invention relates to a connecting arrangement for connecting a mowing knife to a mowing knife drive journal, having an annularly configured connecting element, a bearing arrangement, receivable in the connecting element, for mounting of the connecting element on a mowing knife drive journal, and a mowing knife carrier attachable to the connecting element.

BACKGROUND OF THE INVENTION

Gearing arrangements are known which are used in mowing knife cutting units on mowing attachments of combine harvesters. Such cutting units can comprise gearing arrangements boasting a plurality of eccentric drives arranged in rows, wherein the drive of the mowing knives of a mowing knife cutting unit is realized by eccentrically rotating journals or mowing knife drive journals on the eccentric drive, the rotary motion of the mowing knife drive journal being converted into a linear motion for the mowing knife. An eccentric drive of this type for a mowing knife cutting unit is disclosed, for example, in DE 10 2006 005 354 A1.

In the conversion of the eccentric rotary motion of the mowing knife drive journal into a linear motion for the mowing knife, special connecting arrangements are necessary which have the characteristics necessary for the conversion.

Such a connecting arrangement is exhibited by DE 10 2006 010 825 A1. This discloses a connecting arrangement between a mowing knife drive and a mowing knife which is moved linearly to and fro, an annular connecting element being configured which is slotted over the circumference. The connecting element in turn receives an intermediate ring, which is likewise slotted on its circumference. The intermediate ring here encloses the outer race of a rolling bearing, the rolling bearing being radially supported on the mowing knife drive journal. The connecting element is provided at its slot with a clamping screw, by which the connecting element is clamped to the intermediate ring and the outer race of the rolling bearing. The connecting element thus constitutes a clamping device. The connecting element is configured in one piece with the shaft of a mowing knife carrier, a corresponding mowing knife being able to be fastened on the mowing knife carrier. The inner face of the intermediate ring and the outer face of the outer race are spherically configured and allow a slight adjustable axial inclination of the intermediate ring relative to the rotation axis of the rolling bearing, so that the mowing knife carrier, or a mowing knife fastened thereon, is adjustable in terms of its angular position to the mowing knife drive journal or to the rotation axis of the rolling bearing. It is envisaged that the adjustment is made by loosening the clamping screw on the connecting element, so that the intermediate ring can be adjusted relative to the outer race. Following the adjustment, the connecting element is clamped to the intermediate ring and to the outer race of the rolling bearing respectively, so that the connecting element and the mowing knife drive journal are fixedly connected to each other.

The connecting arrangement disclosed in DE 10 2006 010 825 has the following characteristics, which can be detrimental in the event of prolonged operation of the mowing knife cutting unit: the slotted construction of the connecting element and of the intermediate ring makes sealing against the environment considerably more difficult, so that a contamination and regular lubrication of the rolling bearing is inevitable. To this end, complex lubrication bores in the mowing knife drive journal are necessary. The necessary adjustment of the mowing knife carrier is made during assembly of the connecting arrangement and is fixedly set during operation. Thus already light operating loads on the mowing knife carrier cause wear producing loads on the rolling bearing which may axially overload said rolling bearing during operation, the rolling bearing being configured as a radial bearing. As a result of the tightly clamped connection between the connecting element and mowing knife drive journal via an intermediate ring, an axial displacement or adjustment of the connecting element relative to the rotation axis of the rolling bearing or longitudinal centre axis of the mowing knife drive journal is possible only to a very limited extent. Not least, the disclosed connecting arrangement has a high multiplicity of parts and corresponding maintenance complexity.

The object of the invention is seen in defining a connecting device of the type stated in the introduction, by which the aforementioned drawbacks are partially or totally eliminated.

The object is achieved according to the invention through the teaching of patent claim 1. Further advantageous embodiments of the invention are provided by the sub-claims.

SUMMARY OF THE INVENTION

According to the invention, a connecting arrangement of the type stated in the introduction comprises a connecting element, which is configured such that it is uninterruptedly closed over the circumference and forms a bearing ring which radially on the inside is spherically shaped relative to a rotation axis of the connecting element, the bearing arrangement comprising a bearing bushing which radially on the outside is spherically configured for reception in the bearing ring and, for the fastening of the mowing knife carrier to the connecting element, fastening means being provided, which engage or are disposed on the connecting element radially on the outside. The connecting element is configured closed, i.e. unslotted, over its circumference and hence offers a fixed-diameter bearing ring which encloses the bearing arrangement, the bearing ring enclosing the bearing bushing without a clamping device. As a result of the spherically configured inner face of the bearing ring and the spherically configured outer face of the bearing bushing, the bearing ring and bearing bushing are in direct mutual engagement, so that an intermediate ring can be dispensed with. The inner diameter of the bearing ring and the outer diameter of the bearing bushing are mutually tailored such that the bearing bushing is able to move in a radially unrestrained manner within the bearing ring, such that the position of the rotation axis of the bearing ring relative to the position of the rotation axis of the bearing bushing is variable during operation of the mowing knife cutting unit. Wear-producing loads upon the bearing arrangement are thereby prevented. The closed, unslotted configuration of the connecting element allows an all-round effective sealing of the bearing arrangement against the environment, whereby complex lubrication measures and contamination of the bearing arrangement can be reliably and permanently prevented. The closed configuration of the connecting element ensures a geometry with constant outer diameter, so that further fastening points with constant geometry, in the form of mounting bores on the connecting element, can be provided. As a result of the mounting bores on the connecting element, the mowing knife carrier and the connecting element can be configured separate from each other. The mowing knife carrier is thus able to be separated from the connecting element and, in addition, to be variably adjusted relative to the connecting element, whereby, in particular, the installation complexity and adjustment for the mowing knife carrier, and hence for a mowing knife mountable on the mowing knife carrier, are simplified. The bearing bushing is configured without slots on its circumference and is received in a positive-locking manner in the bearing ring of the connecting element. As a result of the spherical shapings of the outer face of the bearing bushing and the inner face of the bearing ring, inclinations of the bearing bushing relative to the bearing ring are possible. The bearing bushing is preferably made of metal, plastic or ceramic and should be regarded as a separate component of the bearing arrangement, but not as part of an actual bearing, for example a rolling bearing. The bearing bushing can therefore also be referred to as a simple bushing, or as a guide bushing, liner, sleeve or the like. The mowing knife carrier is preferably bolted to the connecting element via the mounting bores.

The bearing ring configured on the connecting element comprises, for the insertion of the bearing bushing, recesses arranged offset by 180° on the circumference. The recesses are configured on the rims of the spherical inner face such that the bearing bushing can be inserted into the bearing ring in a position which is twisted or tilted by 90° relative to its bearing position. Through renewed 90°-twisting of the bearing bushing following its insertion into the bearing ring, the bearing bushing is received in a positive-locking manner in the bearing ring, so that the outer face of the bearing bushing and the inner face of the bearing ring come together and together form a spherical bearing surface pair. The recesses on the bearing ring enable the bearing bushing to be inserted without either the bearing ring or the bearing bushing respectively having to be slotted or opened on their circumference, and without them respectively forming a closed contour or shape and also, therefore, closed bearing surfaces.

The bearing arrangement comprises an outer race of a rolling bearing, which is received radially on the inside by the bearing bushing. The rolling bearing has an inner race and an outer race and is configured, for example, as a radial cylindrical roller bearing with cylindrical outer face on the outer race and cylindrical inner face on an inner race. The rolling bearing is received by a cylindrical inner face of the bearing bushing. By the term rolling bearing should likewise be understood a ball bearing, tapered roller bearing or needle roller bearing, which could here alternatively be used. In place of the rolling bearing, a plain bearing of correspondingly wear-resistant configuration could also be used.

The rolling bearing is mounted or supported on a mowing knife drive journal, the mowing knife drive journal likewise being configured cylindrically in accordance with the inner face of the inner race of the rolling bearing.

On the connecting element a cover is provided, which axially closes off the bearing ring at the free end of a mowing knife drive journal relative to the rotation axis and fully covers the bearing arrangement and a mowing knife drive journal from the environment on the near side of the bearing ring. The cover is configured in the form of a circular cap, which is inserted into a cylindrical opening of the connecting element, configured on the rim of the bearing ring, or is mounted on a cylindrical rim or crown configured on the connecting element. The cap is formed from a rubber-coated or plastic-coated metal plate, the configuration comprising just one of the materials also being possible. Through a suitable fit, preferably a press fit, between the cap or cap rim and the opening on the connecting element, a sealing of the bearing arrangement against the environment is established.

On the opposite side of the bearing arrangement or on that side of the bearing arrangement which in the axial direction relative to the mowing knife drive journal is facing away from the cover, sealing means are provided, which seal off the bearing arrangement against the environment on that side of the bearing ring facing away from the cover, i.e. at the foot of a mowing knife drive journal. The sealing means are arranged such that they extend between a mowing knife drive journal and a cylindrical opening of the connecting element configured on the other rim of the bearing ring or a cylindrical rim or crown configured there on the connecting element, so that the bearing arrangement is thereby also axially closed off on the other side of the bearing ring, i.e. at the non-free end of a mowing knife drive journal or at its foot. As a result, the bearing arrangement and the mowing knife drive journal are fully sealed off against the environment.

The sealing means comprise a first sealing ring and a second sealing ring. The first sealing ring is supported on a mowing knife drive journal and the second sealing ring on the connecting element or on the bearing ring. Both sealing rings together have a common radial overlap region, the second sealing ring being arranged to lie radially on the outside relative to the first sealing ring. The first sealing ring has a spherical outer face, which is overlapped by a rim or sealing rim configured on the second sealing ring. In a basic setting, both sealing rings are aligned coaxially to one another. If the two sealing rings are mutually inclined, the rim of the second sealing ring can move on the spherically configured outer face of the first sealing ring without an opening gap being formed between the two sealing rings. The first sealing ring is preferably made of metal and is supported in a press fit on the shaft or foot of a mowing knife drive journal. Similarly, the first sealing ring can also be made of a plastic or of a rubbery material. The second sealing ring preferably comprises an inner ring made of a plastic or of a rubbery material, which inner ring is fitted into an outer supporting ring, the supporting ring being preferably made of metal. The supporting ring is inserted in a cylindrical opening of the connecting element, configured on the rim of the bearing ring, or is mounted on a cylindrical rim or crown configured on the connecting element.

The fastening means can comprise mounting bores, which are configured on the connecting element radially on the outside. To this end, on the connecting element can be configured projections or reinforcements or fastening lugs or the like, on which there are arranged appropriate bores for the fastening of the mowing knife carrier.

The mowing knife carrier has a mounting flange, with which the mowing knife carrier can be bolted onto the mounting bores of the connecting element. The mounting flange has threaded bores, which are arranged aligned with the mounting bores on the connecting element. The mounting flange is preferably integrally connected to a shaft of the mowing knife carrier, which shaft can be fitted with a mowing knife.

The mounting bores of the connecting element are preferably not circular, but are preferably configured as elongated bores, such that the mowing knife carrier can be bolted on by its flange such that it is adjustable axially to the rotation axis of the connecting element. Through different positions of the threaded bores relative to the long-hole bores on the flange of the mowing knife carrier, displacements of the mowing knife carrier can be made, whereby an adjustment of the mowing knife carrier axially to the mowing knife drive journal can be realized. The flange is preferably bolted onto the connecting element by threaded bolts, which extend through the elongated bores. It is here advantageous that the connecting element with bearing arrangement can be fitted on a mowing knife drive journal independently from an adjustment of the mowing knife carrier.

In an alternative illustrative embodiment, the fastening means comprise a clamping device configured as a mounting ring, which is connected to the mowing knife carrier and can be clamped around the connecting element radially on the outside. The mounting ring is configured, for example, as a slotted clamping ring, which is fixedly connected to the mowing knife carrier or is even configured in one piece therewith. The clamping ring is placed around the connecting element radially on the outside and can be clamped to this, for example, by a clamping screw. The clamping ring can here be arranged so as to be adjustable in the axial direction relative to the mowing knife drive journal, so that an adjustment of the mowing knife drive journal can be realized. The mounting ring can similarly be configured as a mounting frame, so that not an annular, but rather a frame-shaped clamping device is formed. In addition, it is possible to configure the clamping device also in multipart construction, for example by using two opposing clamps connected with clamping screws.

With reference to the drawings, which show an illustrative embodiment of the invention, the invention, as well as further advantages and advantageous refinements and embodiments of the invention, are described and explained in greater detail below.

DETAILED DESCRIPTION OF THE PREFERRED EMBODIMENTS

Figure 1:
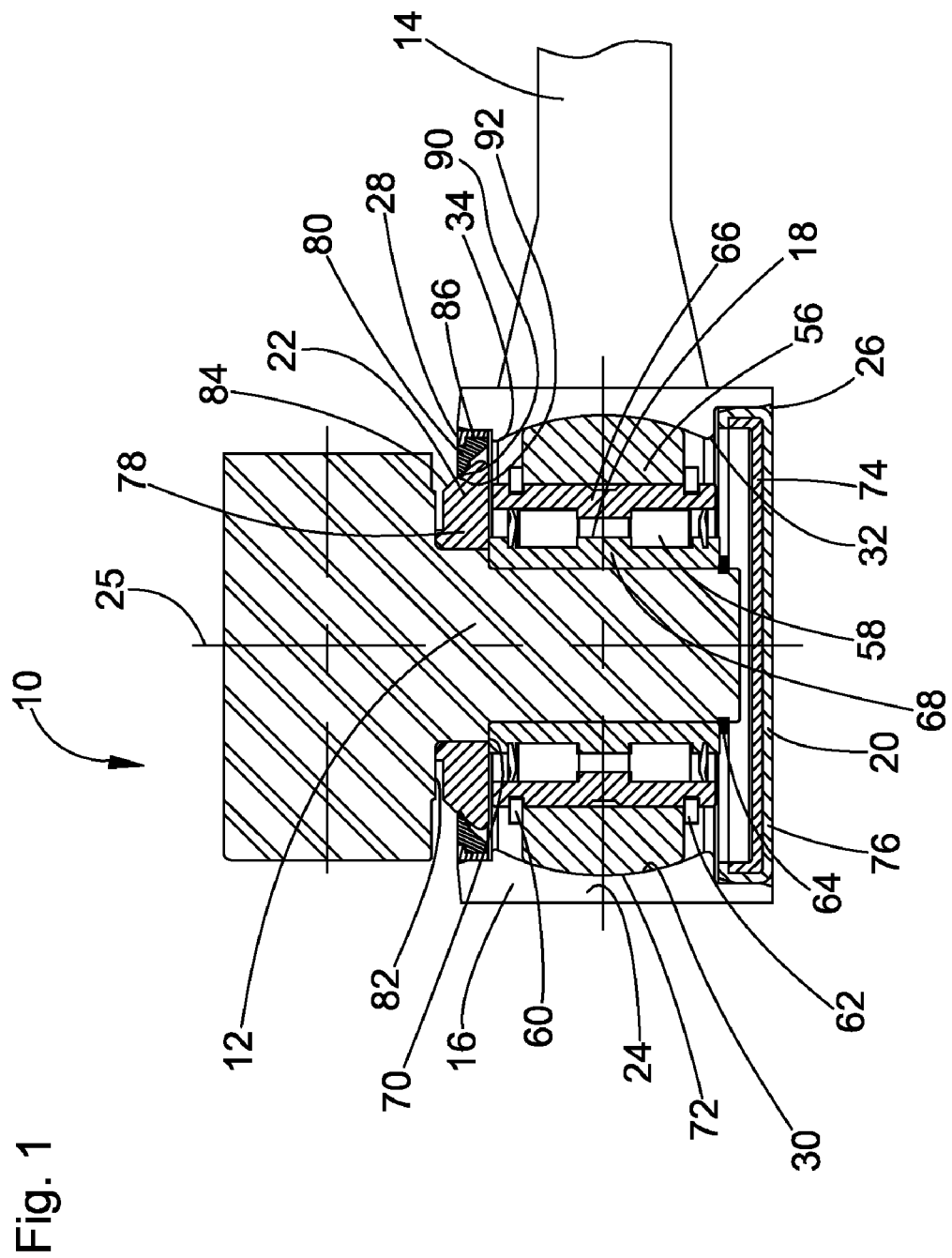
FIG. 1 shows a schematic cross-sectional view of a connecting arrangement according to the invention by a first cutting plane passing through the central axis of the bearing ring and the mowing knife drive journal.
Figure 2:
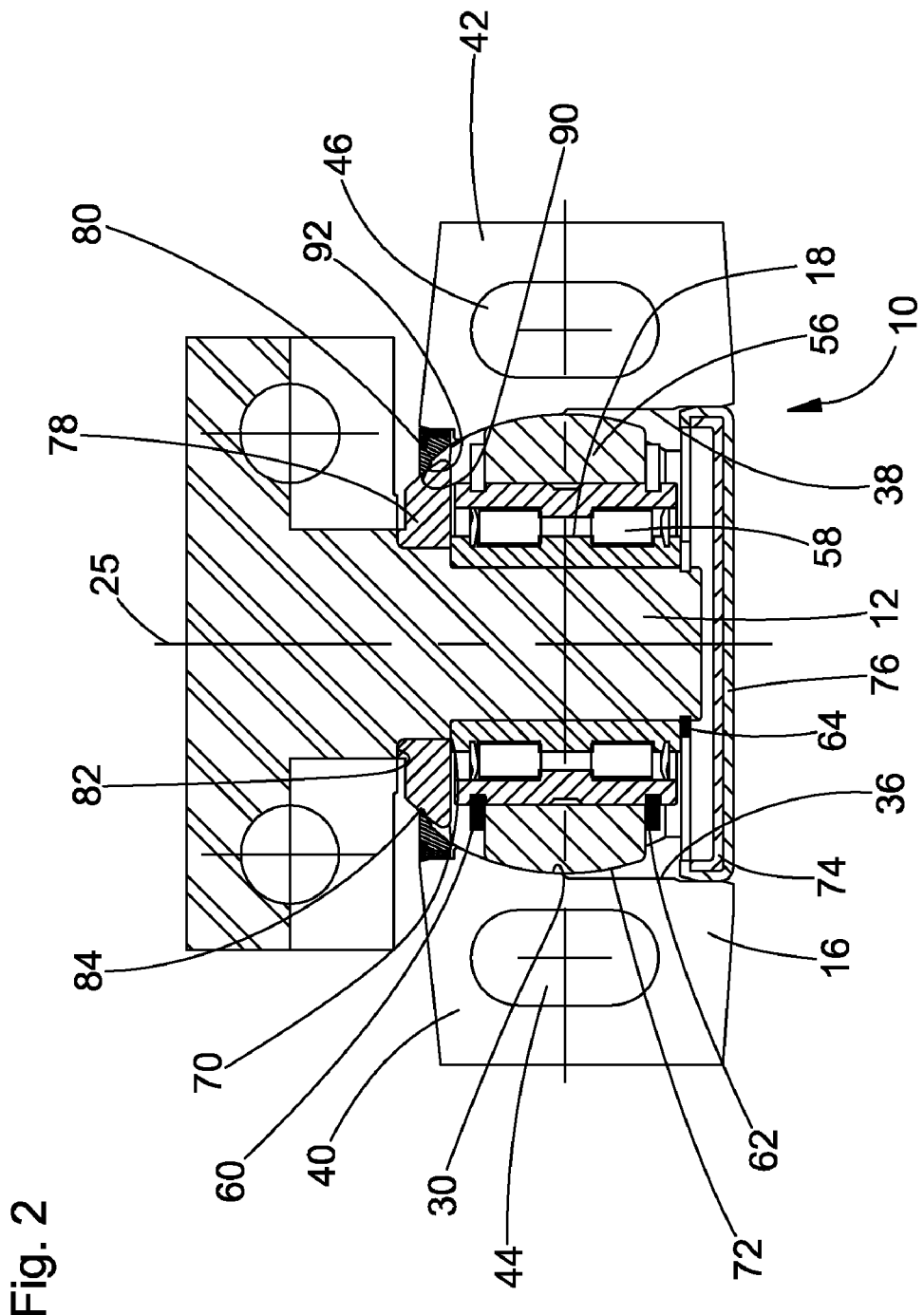
FIG. 2 shows a further schematic cross-sectional view of the connecting arrangement of FIG. 1 by a second cutting plane passing through through the central axis of the bearing ring and the mowing knife drive journal and disposed at 90 degrees to the first cutting plane of FIG. 1.
Figure 3:
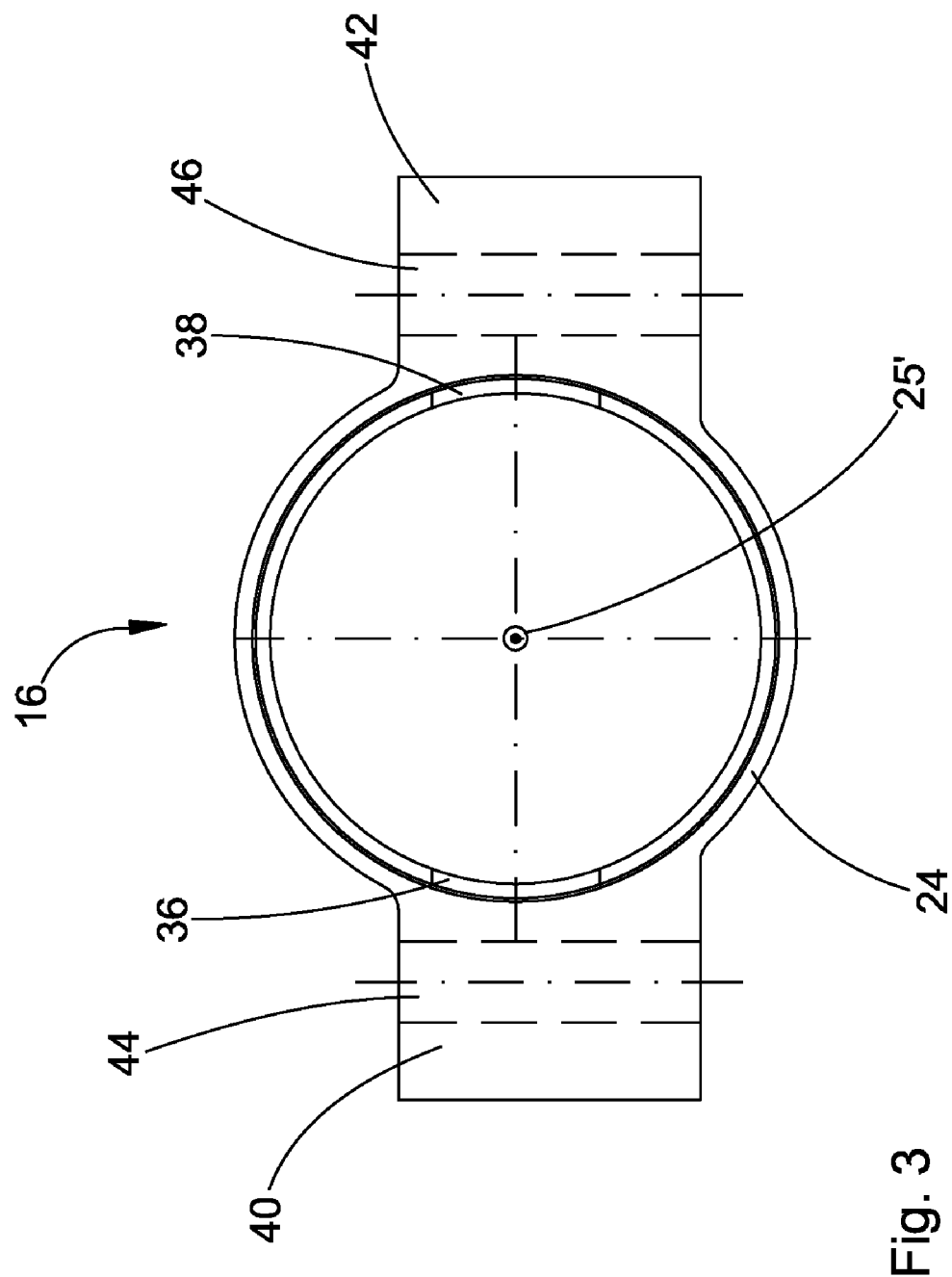
FIG. 3 shows a schematic top view of the connecting element of the connecting arrangement of FIGS. 1 and 2.
Figure 4:
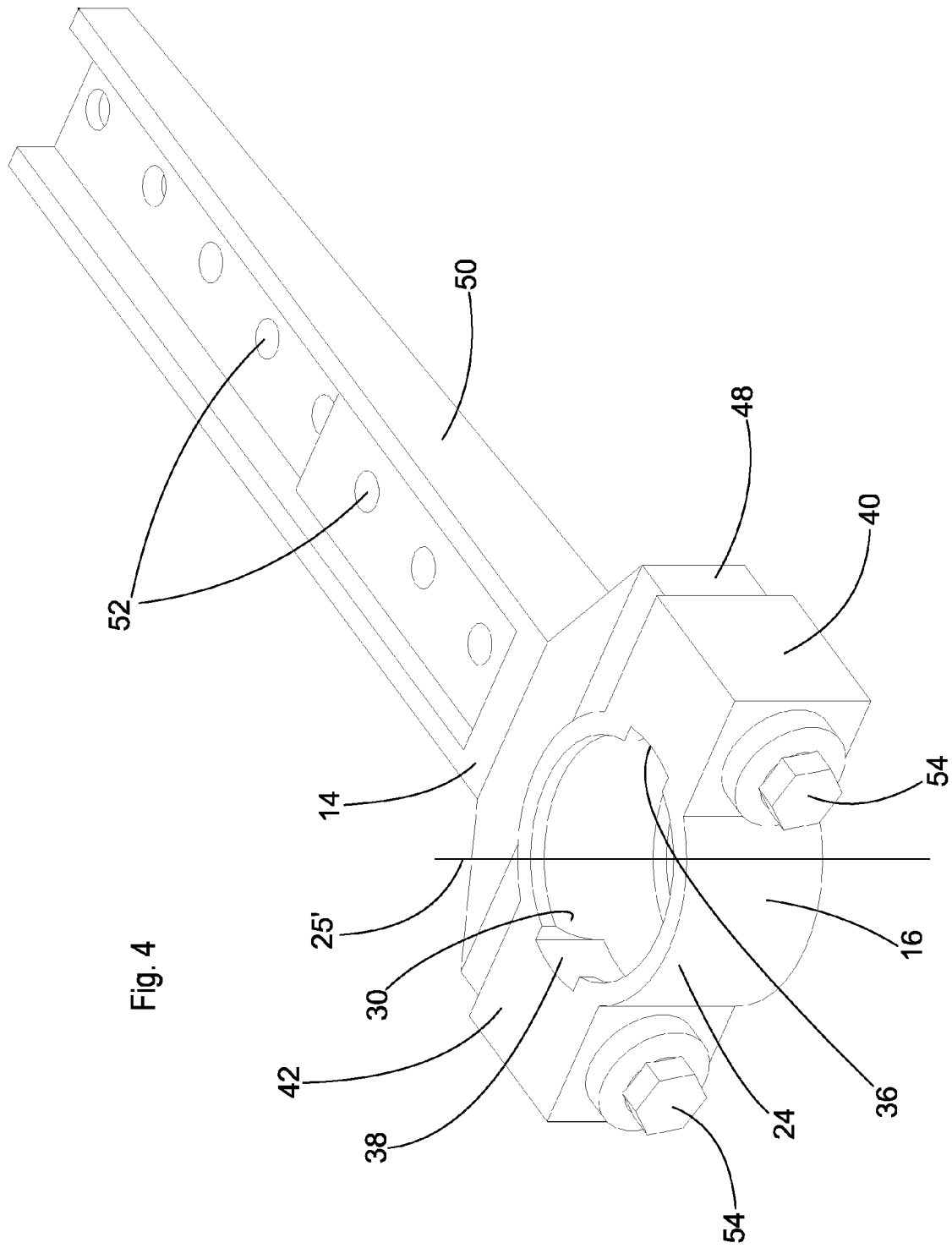
FIG. 4 shows a schematic perspective view of the connecting element with a bolted-on mowing knife carrier.
Figure 5:
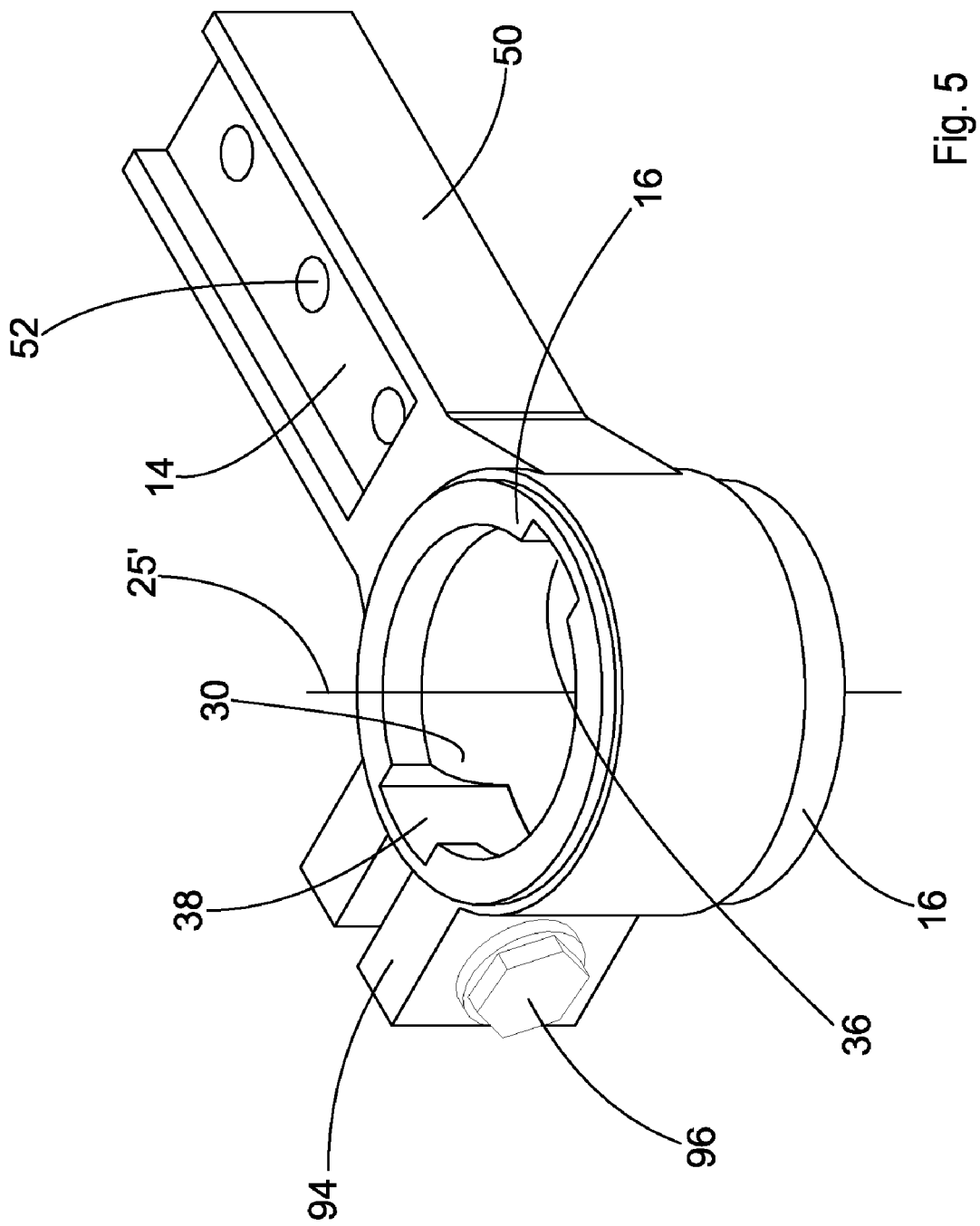
FIG. 5 shows a schematic perspective view of the connecting element with a clamped-on mowing knife carrier that is an alternative to the embodiment of FIGS. 1-4.

A connecting arrangement 10 represented in FIGS. 1 and 2 serves to connect a mowing knife (not shown) to a mowing knife drive journal 12. The mowing knife drive journal 12 extends from an eccentric drive (not shown), which can be used, for example, in a mowing device or a cutting unit of a combine harvester or some other agricultural machine. Via the eccentric drive with mowing knife drive journal 12, rotary motions of the mowing knife drive journal 12 can be converted by means of a connecting arrangement 10 according to the invention into linear motions for the cutting motion of a mowing knife carrier 14 fitted with a mowing knife, the mowing knife drive journal 12 performing eccentric rotary motions which result in a pendulous linear motion of the mowing knife carrier 14. The mowing knife carrier 14 performs, in this context, linear to-and-fro motions. The connecting arrangement 10 comprises, in addition to a mowing knife carrier 14, a connecting element 16, which is represented in further details in FIGS. 3 and 4. The connecting arrangement 10 further comprises a bearing arrangement 18, as well as a cover and sealing means 22 for sealing off the connecting element 16 from the environment.

The connecting element 16 forms a bearing ring 24, which is closed over its circumference and which has a rotation axis 25' aligned coaxially to the centre axis of the mowing knife drive journal 12. The bearing ring 24 has opposing cylindrical openings 26, 28 aligned centrically to the rotation axis 25'. The bearing ring 24 possesses a spherical inner face 30, akin to the surface of a ball, which is delimited at the openings 26, 28 respectively by a rim 32, 34. The rim 32 assigned to the opening 26 has recesses 36 arranged mutually offset by 180°, which interrupt the rim 32 and extend axially to the rotation axis up to about the middle of the inner face 30. The recesses 36, 38 can be detected in FIGS. 2, 3 and 4. On the outer side of the connecting element 16, laterally disposed mounting flanges 40, 42 are provided, which respectively have fastening means 44, 46 in the form of through bores, in particular elongated through bores. The mowing knife carrier 14 comprises a mounting flange 48, which is preferably integrally connected to a shaft 50, the shaft 50 being provided with a plurality of mounting bores 52 for the fastening of one or more mowing knives. The mounting flange 48 configured on the mowing knife carrier 14 is provided with threaded bores, through which it is connected to the connecting element 16 by means of threaded bolts 54. The threaded bolts 54 here extend through the elongated bores 44, 46 configured on the mounting flanges 40, 42 of the connecting element 16 and are engaged with the threaded bores configured on the mounting flange 48 of the mowing knife carrier 14.

The bearing arrangement 18 comprises a bearing bushing 56, which is of closed or unslotted configuration on its circumference, a rolling bearing 58, as well as appropriate retaining rings (snap rings or circlips) 60, 62, 64 for the axial securement of the bearing bushing 56 on the rolling bearing 58 or of the rolling bearing 58 on the mowing knife drive journal 12. The rolling bearing 58 is configured as a cylindrical roller bearing having an outer race 66 and an inner race 68, the inner race 68 being mounted with a cylindrical bearing surface on the mowing knife drive journal 12. The inner race 68 is here axially fixed by a shoulder 70 configured at the foot of the mowing knife drive journal 12 and the retaining ring 64 disposed at the free end of the mowing knife drive journal 12. The outer race 66 has a cylindrically configured bearing surface, which is arranged radially on the outside relative to the rotational centre axis 25' and on which the bearing bushing 56 is radially mounted with a cylindrically configured bearing surface arranged radially on the inside relative to the rotation axis 25'. The bearing bushing 56 is here axially fixed by the retaining rings 60, 62 disposed on the outer race 66. The bearing bushing 56 has a spherical outer face 72, akin to the surface of a ball, configured in accordance with the inner face 30 of the bearing ring 24. The bearing bushing is preferably formed from a wear-resistant plastic. It can also, however, be made of a metallic or ceramic material.

The cover 20 comprises a circular metal cap 74, which is coated with a rubbery or plastic-like coating 76. The dimensions of the cover 20 are tailored to the diameter of the opening 26 of the connecting element 16, which opening is disposed at the free end of the mowing knife drive journal 12, such that the cover is secured to the connecting element 16 in a press fit. A threaded connection between the cover 20 and the opening 26 could also be provided, in which case, where necessary, a coating 76 of the metal cap 74 could be dispensed with and an external thread on the metal cap 74 could be directly engaged with an internal thread on the opening 26.

The sealing means 22 comprise a first sealing ring 78 and a second sealing ring 80. The first sealing ring 78 is mounted on the shoulder 70 at the foot of the mowing knife drive journal 12 and is axially fixed between a further shoulder 82 at the foot of the mowing knife drive journal 12 and the inner race 68 of the rolling bearing 58. The first sealing ring 78 has a cylindrical inner ring face and a spherically configured outer ring face 84. Preferably, the first sealing ring is made of metal or plastic. The second sealing ring 80 is in two-part construction and comprises an outer metal ring 86 in which a rubber or plastic ring 88 is embedded, the second sealing ring 80 being fitted by its outer metal ring 86, in a tight-fitting manner, in that opening 28 of the connecting element 16 which is facing toward the foot of the mowing knife drive journal 12. The rubber ring 88 has a sealing rim 90, which extends inwards radially to the rotation axis 25' and which places itself over the spherical outer ring face 84 configured on the first sealing ring 78 and forms an overlap region 92 between the first and second sealing ring 78, 80.

The assembly of the connecting arrangement can be realized as follows: The connecting element 16 is firstly fitted with the bearing bushing 56. To this end, the bearing bushing 56, tilted at an angle of 90° to the rotation axis 25' or to the bearing ring 24, is introduced into the recesses 36, 38 on the rim 32 of the bearing ring 24. Through renewed 90°-tilting of the bearing bushing, the spherical outer face 72 of the bearing bushing 56 and the spherical inner face 30 of the bearing ring 24 can be mutually aligned, so that the bearing bushing 56 is fixed axially to the rotation axis 25' by the rims 32, 34 on the bearing ring 24. There then follows the insertion of the rolling bearing into the inner face of the bearing bushing 24 and the fixing of the rolling bearing 58 by insertion of the retaining rings 60, 62 on the outer race 66 of the rolling bearing 58. This is followed by the insertion of the sealing means 22 (first and second sealing ring 78, 80) into the opening 28 of the connecting element 16. The connecting element 16 can now be slid, together with bearing arrangement 18 and sealing means 22, onto the mowing knife drive journal 12 and can be axially fixed via the retaining ring 64 at the free end of the mowing knife drive journal 12. The opening 26 on the connecting element 16 can now be closed off by mounting or fitting-in of the cover 20, so that the bearing arrangement 18 is protected against contamination from the environment. The mowing knife carrier 14 is bolted by the threaded bolt 54 to the connecting element 16 and, in its relative axial position to the rotation axis 25', can be shifted or adjusted over the elongated bores 44, 46 particularly easily. As a result of the spherical configuration of the outer face 72 of the bearing bushing 56 and of the inner face 30 of the bearing 24, an inclination between the connecting element 16 and the mowing knife drive journal 12 is possible, so that the axial loads for the bearing arrangement 18, which are mentioned in the introduction and arise during operation of a cutting unit, can be reduced or minimized. Furthermore, the cover 20 and the sealing means 22 offer the possibility of protecting the bearing arrangement 18 permanently against contamination, whereby maintenance intervals for the lubrication of the connecting arrangement 10 and repairs due to contamination-induced bearing damage are eliminated or minimized. In the present illustrative embodiment, a single lubrication is envisaged for the entire service life of the connecting arrangement 10.

In an alternative embodiment of the invention, no fastening means configured as elongated bores 44, 46, or on the mowing knife carrier 14 as a mounting flange 48, are provided on the connecting element 16. Instead, the mowing knife carrier 14 is connected to a mounting ring 94 configured as a clamping device or clip, which mounting ring is placed around the connecting element 16. The mounting ring 94 is of slotted configuration on one side and is provided with a clamping screw 96. Via the clamping screw 96, the diameter of the mounting ring 94 can be altered, so that the mounting ring 94 is clamped around the connecting element 16 and connected thereto in a rotationally fixed manner. By slightly undoing the clamping screw 96 or the mounting ring 94, it is possible to loosen the connection between the connecting element 16 and the mowing knife drive journal 12 and to slightly vary the mowing knife carrier 14 in its position axially to the mowing knife drive journal 12, so that an adjustment can be made for the mowing knife carrier 14.

Even though the invention has been described merely on the basis of two illustrative embodiments, in the light of the above description and the drawing a number of varied alternatives, modifications and variants, which fall under the present invention, present themselves to the person skilled in the art.

The invention claimed is:

1. A connecting arrangement (10) for connecting a mowing knife to a mowing knife drive journal (12), said connecting arrangement (10) comprising:
   an annularly configured connecting element (16) having a circumference;
   a bearing arrangement (18) disposed in the connecting element (16) and configured to mount the connecting element (16) on a mowing knife drive journal (12); and
   a mowing knife carrier (14) fixed to the connecting element (16);
   wherein the connecting element (16) is configured such that it is uninterruptedly closed over the circumference and forms a bearing ring (24), said bearing ring being spherically shaped on a radially open polder 09983 inner side relative to a rotation axis (25') of the connecting element (16), said bearing arrangement (18) comprising a bearing bushing (56) which is spherically shaped on a radially outer side and is configured to be received in the bearing ring (24) and for the fastening of the mowing knife carrier (14) to the connecting element (16), fastening means (44, 46, 48, 94) being provided, which engage on the connecting element (16) radially on the outside, and wherein the bearing ring (24) comprises recesses (36, 38) offset from one another by 180° on the circumference to permit insertion of the bearing bushing (56) into the bearing ring (24), said recesses being configured such that the bearing bushing (56) can be inserted into the bearing ring (24) while in a position which is tilted by 90° relative to its bearing position.

2. The connecting arrangement (10) according to claim 1, wherein the bearing arrangement (18) comprises an outer race (66) of a rolling bearing (58), which is received by the bearing bushing (56) on its radially inner side.

3. The connecting arrangement (10) according to claim 2, wherein the rolling bearing (58) is configured to be mounted on the mowing knife drive journal (12).

4. The connecting arrangement (10) according to claim 1, further comprising a cover (20) on the connecting element (16) which encloses the bearing ring (24) at the free end of the mowing knife drive journal (12) to thereby fully seal the bearing arrangement (18) and the mowing knife drive journal (12) from the environment on the near side of the bearing ring (24).

5. The connecting arrangement (10) according to claim 4, further comprising sealing means (22) which seal the bearing arrangement (18) from the environment on a side of the bearing ring (24) facing away from the cover (20).

6. The connecting arrangement (10) according to claim 5, wherein the sealing means (22) comprises a first sealing ring (78) and a second sealing ring (80), the first sealing ring (78) is supported on the mowing knife drive journal (12) and the second sealing ring (80) is supported on the connecting element (16), the second sealing ring (80) and the first sealing ring (78) have a common radial overlap region (92).

7. The connecting arrangement (10) according to claim 1, characterized in that the fastening means (44, 46, 48) having mounting bores which are fixed on the outside of the bearing ring (24).

8. The connecting arrangement (10) according to claim 7, wherein the fastening means (44, 46, 48) have a mounting flange, to which the mowing knife carrier (14) is connected and which can be bolted onto the mounting bores (44, 46) on the connecting element (16).

9. The connecting arrangement (10) according to claim 7, wherein the mounting bores (44, 46) on the connecting element (16) are elongated bores, permitting the mowing knife carrier (14) to be fastened onto the connecting element (16) such that it is adjustable axially to the rotation axis (25') of the connecting element (16).

10. The connecting arrangement (10) according to claim 1, wherein the fastening means (94) comprise a clamping device, in particular a mounting ring, which is connected to the mowing knife carrier (14), wherein said clamping device is configured to be clamped around the connecting element (16) on a radially outer side of the connecting element (16), such that the mowing knife carrier (14) can be clamped to the connecting element (16) and can be adjustable axially to the rotation axis (25') of the connecting element (16).

* * * * *